United States Patent [19]

Moffett et al.

[11] Patent Number: 5,322,893
[45] Date of Patent: Jun. 21, 1994

[54] THERMOPLASTIC ELASTOMERS AND METHOD FOR MAKING

[75] Inventors: Andra J. Moffett; Marinus E. J. Dekkers; Timothy J. Shea, all of Schenectady; John R. Campbell, Clifton Park, all of N.Y.

[73] Assignee: General Electric Company, Schenectady, N.Y.

[21] Appl. No.: 46,877

[22] Filed: Apr. 8, 1993

Related U.S. Application Data

[63] Continuation of Ser. No. 767,701, Sep. 30, 1991, abandoned.

[51] Int. Cl.⁵ ............................ C08L 51/06; C08L 67/02
[52] U.S. Cl. ........................................... 525/64; 525/71; 525/166
[58] Field of Search .................................. 525/64

[56] References Cited

U.S. PATENT DOCUMENTS 4,260,690  4/1981  Binsack ............................ 525/64

FOREIGN PATENT DOCUMENTS 0309800  4/1989  European Pat. Off. .
0340566  4/1989  European Pat. Off. .
9119765  12/1991  PCT Int'l Appl. .

*Primary Examiner*—Patricia A. Short
*Attorney, Agent, or Firm*—William A. Teoli; William H. Pittman

[57] ABSTRACT

Vulcanized blends of EPDM rubber and aromatic polyester are provided by melt extruding mixtures of aromatic polyester, such as polyalkylene terephthalate and functionalized EPDM reactive rubber pairs. An EPDM functionalized with epoxy groups can be vulcanized with an EPDM rubber functionalized with thermally labile ester groups capable of generating epoxy reactive carboxylic acid.

4 Claims, No Drawings

THERMOPLASTIC ELASTOMERS AND METHOD FOR MAKING

This application is a continuation of application Ser. No. 07/767,701, filed Sep. 30, 1991, now abandoned.

BACKGROUND OF THE INVENTION

The present invention relates to thermoplastic elastomers resulting from the dynamic vulcanization of a compatibilized blend of an aromatic polyester and functionalized EPDM rubber. More particularly, the present invention relates to melt extruded dynamically vulcanized blends of aromatic polyester, such as a polyalkylene terephthalate, EPDM rubber functionalized with epoxide functional groups and EPDM rubber functionalized with ester groups which can generate epoxy reactive acid groups under melt extrusion conditions.

Prior to the present invention, thermoplastic elastomers were developed to provide materials which could be processed as thermoplastics and yet have the ability to retract forcibly from a large deformation. A term often associated with thermoplastic elastomers is "dynamic vulcanization" which is described by A. Y. Coran et al., Rubber-Thermoplastic Compositions, Rubber Chem. Technology 55 (1982) 116. More details about dynamic vulcanization is shown by Coran, in Thermoplastic Elastomers, a Comprehensive Review, edited by R. N. Legge et al. on pages 135–156, MacMillan Publishing Company, New York, 1987. In dynamic vulcanization, an elastomer, such as' an EPDM rubber, i.e. an ethylene-propylene-diene monomer rubber is vulcanized during its melt-mixing with molten plastic. Although dynamic vulcanization can provide compositions which are very elastomeric in their performance characteristics, it has been found that when EPDM rubber is dynamically vulcanized during melt mixing with a thermoplastic material, it is often difficult to produce a finely dispersed blend of EPDM and the thermoplastic material at the desired blend ratios of interest. Improved compatibility between thermoplastic resins, such as polybutylene terephthalate (PBT), and EPDM rubber has been achieved by modifying the EPDM rubber with an ester of an α, β-unsaturated acid having an epoxide functional group on the alkoxy portion, such as glycidyl methacrylate, as shown by European patent application 0,274,744. Additional uses of EPDM rubbers modified with an epoxy functional ester of an α, β-unsaturated acid are as impact modifiers for aromatic polyesters, as shown by European patent 0,309,800.

Although the proportions of the EPDM rubber and plastic components have been found to have an effect on physical properties, such as tensile strength (psi) and elongation at break (%), it would be desirable to obtain elastomeric thermoplastic compositions having reduced tensile set (%) as defined hereinafter, or correspondingly enhanced elastic recovery % as well as valuable physical properties, such as tensile strength (psi) and elongation at break (%) resulting from the melt blending of aromatic thermoplastic polyester and EPDM rubber.

As used hereinafter the term "elastic recovery %" means the value in % obtained by subtracting the tensile set % from 100. The tensile set % is measured on ASTM D638, type I, large tensile bars pulled on a screw driven Instron testing machine at room temperature.

The tensile set % can be determined by pulling large ASTM D638 tensile specimens 2.5 inches at a crosshead speed of 20 in/min. and holding the sample at this strain for 10 minutes. The specimens are then removed from the Instron testing machine and put into an oven where they are kept for 45 minutes at 115° C. After the specimens are taken out of the over they are allowed to cool for 10 minutes before the tensile set is determined using the formula:

$$\% \text{ Tensile set} = \frac{L_{after} - L_{original}}{L_{before} - L_{original}} \times 100$$

where: $L_{original}$ is the original length between gauge marks on the specimen (in this case 2.5 inches)

$L_{before}$ is the length between the gauge marks when the specimen is in the grips and pulled to full (100 or 200%) extension.

$L_{after}$ is the length between the gauge marks after the specimen has been taken out of the oven and allowed to cool for 10 minutes.

In copending application serial number 07/540,031, filed Jun. 18, 1990, now abandoned, there are shown thermoplastic elastomers resulting from the dynamic vulcanization of a compatibilized blend of an aromatic polyester and an epoxy functionalized EPDM rubber. There also can be used in the melt extruded blends an effective amount of a free radical initiator or a crosslinking agent such as an organodiamine.

Although various dynamic vulcanization procedures for thermoplastic elastomers (TPE) are available additional methods are constantly being evaluated.

Summary of the Invention

The present invention is based on the discovery that dynamic vulcanization of aromatic polyesters can be achieved by melt extruding an aromatic polyester with a blend of EPDM rubbers functionalized with epoxide functional groups, such as glycidylmethacrylate substituted EPDM rubbers, and EPDM rubber functionalized with ester groups which can generate epoxy reactive acid groups under melt extrusion conditions.

Statement of the Invention

There is provided by the present invention thermoplastic elastomers comprising the extrudate of a melt extruded mixture comprising by weight, (A) 45 to 70% of an aromatic polyester and (B) 30 to 55% of functionalized EPDM rubber consisting essentially of (a) 1 to 99% by weight of an EPDM rubber functionalized with about 0.1 to about 16 epoxy groups, per 1000 carbon atoms and having from about 0.01 to about 20% by weight of epoxy containing grafting material and (b) 99 to 1% by weight of an EPDM rubber functionalized with 0.1 to about 16 of thermally labile carboxylic acid generating ester groups, per thousand carbon atoms and having from 0.1 to 20% by weight of ester containing grafting material.

EPDM rubbers which can be used in the practice of the present invention can be made by a well known procedure, as fully described in patents such as, U.S. Pat. Nos. 2,933,480, 3,093,621, 3,211,709, 3,646,168, 3,790,519, 3,884,993, 3,894,999 and 4,059,654 which are incorporated herein by reference. A typical procedure for making the EPDM rubber is by reacting varying amounts of ethylene, propylene and polyene monomer containing a plurality of carbon to carbon double bonds which is carried out in the presence of a catalyst and a solvent medium. The polyene monomer which is used as a third component in making the EPDM terpolymer, in addition to the ethylene and propylene to form a terpolymer of ethylene, mono-olefin, preferably propylene, and a polyene, include such polyene monomers as open chained polyunsaturated hydrocarbons containing 4–20 carbon atoms, such as, 1,4-hexadiene, monocyclic polyenes and polycyclic polyenes. The polyunsaturated bridge ring hydrocarbons or halogenated bridged ring hydrocarbons are preferred. Examples of such bridged ring hydrocarbons include the polyunsaturated derivatives of bicyclo(2,2,1)heptane, wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes, wherein the alkenyl groups contains about 3–20 carbon atoms and preferably 3–10 carbon atoms. Other bridged ring hydrocarbons include polyunsaturated derivatives of bicyclo(2,2,2)octane as represented by bicyclo(3,2,1)octane polyunsaturated derivatives of bicyclo(3,3,1)nonane and polyunsaturated derivatives of bicyclo(3,2,2)nonane.

Specific examples of preferred bridged ring compounds include 5-methyldene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadienes, the methyl butenyl norbornenes such as 5-(2-methyl-2-butenyl)-2-norbornene or 5-(3-methyl-2-butenyl)-norbornene, and 5-(3-dimethyl-4-hexenyl)-2-norbornene. The elastomer prepared from 5-ethylidene-2-norbornene is preferred.

The EPDM backbone rubber may contain chemically bound molar ratios of ethylene to propylene or other

mono-olefins, varying, for example, between 95 to 10, ethylene and 5 to 90 to propylene, and preferably between 70 to 30 ethylene and 30 to 70 propylene. The polyene or substituted polyene may be chemically bound therein in an amount of 0.1 to 10 mol percent, and preferably 0.3 to 1 mol percent. The level of unsaturation in the backbone rubber may range from 0–20 double bonds, per 1,000 carbon atoms in the polymer chain.

The polymerization reaction for preparation of the EPDM is carried out in the presence of a catalyst in a solvent medium. The polymerization solvent may be any suitable inert organic solvent that is liquid under reaction conditions. Examples of satisfactory hydrocarbon solvents are straight-chain paraffins having from 5–8 carbon atoms with best results often being secured by the use of hexane, aromatic hydrocarbons and preferably an aromatic hydrocarbon having a single benzene nucleus, such as benzene, toluene and the like and saturated cyclic hydrocarbons having boiling point ranges approximately those of the straight chain paraffin hydrocarbons and aromatic hydrocarbons described above and preferably saturated cyclic hydrocarbons having 5–6 carbon atoms in the ring nucleus. The solvent selected can be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler-type catalyst used in the polymerization reaction.

The interpolymerization is carried out in the presence of a Ziegler catalyst of the type well known to the prior art. Such Ziegler-type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleev periodic system of elements, such as titanium, vanadium and chromium halides with an organo-metallic compound of a metal of Groups I, II or III of the Mendeleev periodic system which contains at least one carbon-metal bond, such as trialkyl aluminum and alkyl aluminum halides in which the alkyl groups contain from 1–20 and preferably 1–4 carbon atoms.

The preferred Ziegler catalyst is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, having the general formula R-AlCl and R$_2$AlCl and the corresponding sesquichlorides of the general formula R$_3$Al$_2$Cl$_3$ in which R is methyl, ethyl, propyl, butyl or isobutyl in the catalyst system, the aluminum to vanadium mol ratio of the aluminum and vanadium compounds may be within the range of 5:1 to 200:1 and preferably within the range of 15:1 to 60:1 with best results being secured in the ratio of 40 aluminum to 1 vanadium. These same ratios apply with respect to corresponding compounds of others of the heavy metals substituted for the vanadium compound and the organometallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride, per 5–300 moles of aluminum and more preferably 15–60 moles of aluminum with 40 moles of aluminum per mole of vanadium yielding the best results.

The polymerization is preferable carried out on a continuous basis in a reaction vessel closed to the outside atmosphere which is provided with an agitator cooling means and conduit means for continuously supplying the ingredients of the reaction including monomer catalyst and accelerators and conduit means for continuously withdrawing solution containing elastomer, and the catalyst is killed by the addition of a catalyst deactivator.

In order to achieve thermoplastic elastomers having optimum elastic recovery, it has been found essential to use EPDM rubber modified with an epoxy compound, such as glycidyl methacrylate and EPDM rubber modified with esterified acid functional groups, where the ester groups are thermally labile under melt extrusion conditions. Epoxy compounds included with the formula,

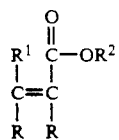

can be used to modify the EPDM rubber, where $R^2$ is an organic group having an epoxide functionality, and R and $R^1$ are $R^1$ are monovalent radicals selected from e class consisting of hydrogen, methyl,ethyl, propyl or $C_{(4-8)}$ alkyl, aralkyl, cyclic or a $C_{(6-13)}$ aromatic organic group. Suitable epoxy functional graft monomers are glycidyl ethers of unsaturated alcohols, i.e., allyl-glycidyl ether, methallyl-glycidyl ether; glycidyl esters of unsaturated carboxylic acids; i.e., glycidyl-2-ethyl acrylate, glycidyl-2-propyl, acrylate, and glycidyl acrylate; glycidyl ethers of alkenylphenols, i.e., isopropenylphenyl-glycidyl ethers; vinyl and allyl esters of epoxy carboxylic acids, vinyl esters of epoxidized oleic acid; and the like. Preferred as the graft monomer herein is glycidyl methacrylate (GMA). Modification of the EPDM rubber with the epoxy functional monomer is preferably achieved by premixing the epoxy monomer with a free radical initiator and thereafter blending the resulting mixture with the EPDM rubber. The resulting blend can be extruded at a temperature of about 100° C. to about 350° C. In the grafting reaction, there can be used 0.1 to 20 parts of the epoxy compound and preferably 2 to 10 per 100 parts by weight of the EPDM rubber.

If desired, the grafting reaction also can be carried out in a solvent solution with the unsaturated EPDM rubber present at a concentration which can range from about 10 to 30% by weight. Suitable organic solvents are for example, $C_{(5-10)}$ aliphatic hydrocarbons, such as hexane, heptane and octain.

The reaction can be conducted with constant stirring at an elevated temperature within the range of 125°–200° C., and the time ranging from ½ to 2 hours. Preferably, the functionalization of the EPDM with the epoxy compound is achieved under melt conditions in the presence of a radical initiator such as, 2,5-dimethyl-2,5-bis(t-butylperoxy)hexane. The expression "epoxy containing grafting material" means the epoxy groups or radicals chemically combined to the EPDM molecular chain.

Melt functionalization of the EPDM rubber with esterified acid groups can be achieved by a method similar to the procedure used in modifying the EPDM rubber with epoxy functional monomer. For example, there can be used in the grafting reaction, from about 0.1 to 20 parts of an acrylic ester such as t-butylmethacrylate (TBMA), dimethylphenylacrylate, methylphenylacrylate, isopropylacrylate, cyclohexylacrylate and preferably 2 to 15 parts per 100 parts of the EPDM rubber. Grafting can be achieved by mixing the ester monomer with a free radical initiator and thereafter blending the resulting mixture with the EPDM rubber. The resulting blend can be extruded at a temperature of about 100° C. to about 250° C. The expression "ester containing grafting material" means the ester groups chemically combined to the EPDM molecular chain.

The polyesters suitable for use herein may be any of the linear or branched saturated polyesters known to those skilled in the art. Generally, the polyesters will comprise linear saturated polyesters derived from alkylene glycols such as ethylene glycol, propylene glycol, 1,4-butanediol, etc. including cycloaliphatic glycols, such as 1,4-cyclohexanedimethanol and mixtures of any of these glycols with one or more aromatic dicarboxylic acids. Preferably, the polyesters can comprise polyalkyene terephthalates prepared by known techniques, such as the transesterification of esters of terephthalic acid alone or mixtures of esters of terephthalic acid and isophthalic acid with a glycol or a mixture of glycols and subsequent polymerization by heating the glycols and the free acids or halide derivatives thereof. Suitable methods are described in U.S. Pat. Nos. 2,465,319 and 3,045,539 incorporated herein by reference. In addition, blends of one or more of these polyesters or copolyesters may be employed. A suitable poly(1,4-butylene terephthalate) resin is commercially available from General Electric Company under the trade designation VALOX ® 315 and poly(ethylene terephthalate) resins are well known and available commercially.

In the practice of the preferred form of the invention the aromatic polyester is compounded initially with some or all of the EPDM rubber functionalized with epoxy groups followed by the incorporation of the EPDM rubber modified with thermally labile ester groups under melt extrusion conditions. Temperatures in the range of from 150° C. to 350° C. can be used. Although it is preferred to employ at least some of the epoxy modified EPDM rubber initially with the aromatic polyester, followed by the addition of the ester modified EPDM rubber, effective results also can be achieved by compounding all three of the components in one step. It has been found that as long as the three key ingredients are included in the final blend, a compatibilized, dynamically vulcanized thermoplastic elastomer will result using melt extrusion conditions.

In order that those skilled in the are will be better able to practice the present invention, the following example is given by way of illustration and not by way of limitation. All parts are by weight unless otherwise indicated.

EXAMPLE 1

Several blends of polybutylene terephthalate (Valox resin) with EPDM rubber were melt extruded at temperatures in the range of between 252° C. to 270° C. The blends were then melt extruded with additional EPDM rubber at 270° C. In particular instances, EPDM rubber was used free of glycidyl acrylate modification and t-butylmethacrylate modification. The following results were obtained where mephr is molar equivalents per 100 parts of rubber, GMA is glycidylmethacrylate, TBMA is tertiary butylmethacrylate:

| Dynamically Vulcanized PBT/EPDM Blends | | | | | |
|---|---|---|---|---|---|
| Blend Composition | I | B | C | II | III |
| 1st Pass (Temp, °C.) | 252 | 252 | 252 | 270 | 252 |
| Valox 315 | 50 | 50 | 50 | 50 | 50 |
| EPDM-GMA (42 mephr) | 33 | — | 33 | 33 | 16.5 |
| EPDM E801 | — | 33 | — | — | — |
| EPDM-TBMA (56 mephr) | — | — | — | 17 | — |
| 2nd Pass (Temp. °C.) | 270 | 270 | 270 | 270 | 270 |
| EPDM E801 | — | — | 17 | — | — |
| EPDM-GMA (42 mephr) | — | — | — | — | 13 |
| EPDM-TBMA (56 mephr) | 17 | 17 | — | — | 14 |
| Properties | | | | | |
| Strain @ | 358 | 59 | 146 | 295 | 470 |

-continued

| Blend Composition | Dynamically Vulcanized PBT/EPDM Blends | | | | |
|---|---|---|---|---|---|
| | I | B | C | II | III |
| break (%) Strength @ (Break (psi) | 3191 | 1815 | 2557 | 2768 | 3620 |
| Strength (100% (psi) | 2514 | — | 2496 | 2278 | 2665 |
| Tensile set @ 100% (115° C. (%) | 24.5 | — | 47.2 | 23.6 | 27.4 |

The above results show that blend compositions I, II and III, which are within the scope of the present invention, show a minimum tensile set while exhibiting maximum physical properties. Optimum results were achieved in composition III which incorporated the epoxy modified EPDM rubber over two stages of melt extrusion. A substantial reduction in physical properties are shown with composition II which employed the epoxy modified EPDM and ester modified EPDM in the first pass. Compositions B and C did not experience dynamic vulcanization as the result of the absence of both EPDM components in the polyester blend which eliminated the interaction between the epoxy functional groups and the acid functional groups of the EPDM rubbers.

Although the above example is directed to only a few of the very many variables which can be used in the practice of the present invention, it should be understood that the present invention is directed to a much broader variety of dynamically vulcanized thermoplastic elastomers as a result of using a variety of aromatic polyesters and epoxy modified EPDM rubber and ester modified EPDM rubber as set forth in the description preceding this example.

What is claimed is:

1. A method for making a dynamically vulcanized thermoplastic elastomer which comprises:
   (1) melt extruding at a temperature of from 150° C. to 350° C., a blend of (A), an aromatic thermoplastic polyester, and (B), an EPDM rubber blend consisting essentially of (a) an EPDM rubber functionalized with 0.1 to about 16 epoxy groups, per 1000 carbon atoms and having from about 0.01 to about 20% by weight of epoxy containing grafting material and (b) an EPDM rubber functionalized with about 0.1 to 16 carboxylic acid generating ester groups per 1000 carbon atoms, which carboxylic acid generating ester groups are thermally labile at a temperature in the range of from 150° C. to 350° C.

2. A method in accordance with claim 1, where the aromatic thermoplastic polyester is a polyalkylene terephthalate.

3. A method in accordance with claim 1, where the EPDM rubber (B)(a) functionalized with epoxy radicals is functionalized with glycidyl methacrylate groups.

4. A method in accordance with claim 1, where the EPDM rubber (B)(a) is functionalized with thermally labile t-butylmethacrylate groups.

* * * * *